(12) United States Patent
Goering

(10) Patent No.: US 9,534,892 B2
(45) Date of Patent: Jan. 3, 2017

(54) DISTANCE MEASURING SYSTEM

(71) Applicant: TRIMBLE Jena GmbH, Jena (DE)

(72) Inventor: Hermann Goering, Jena (DE)

(73) Assignee: Trimble Inc., Sunnyvale, CA (US)

( * ) Notice: Subject to any disclaimer, the term of this patent is extended or adjusted under 35 U.S.C. 154(b) by 747 days.

(21) Appl. No.: 13/948,946

(22) Filed: Jul. 23, 2013

(65) Prior Publication Data

US 2014/0043597 A1    Feb. 13, 2014

(30) Foreign Application Priority Data

Aug. 9, 2012 (DE) .................. 10 2012 107 329

(51) Int. Cl.
*G01C 3/08* (2006.01)
*G01S 7/481* (2006.01)
*G01S 7/497* (2006.01)

(52) U.S. Cl.
CPC ............... *G01C 3/08* (2013.01); *G01S 7/4812* (2013.01); *G01S 7/497* (2013.01)

(58) Field of Classification Search
CPC ............. G01S 7/497; G01C 3/02; G01C 3/08; G01B 11/02
See application file for complete search history.

(56) References Cited

U.S. PATENT DOCUMENTS

| | | | |
|---|---|---|---|
| 4,113,381 A * | 9/1978 | Epstein | G01C 3/02 250/231.14 |
| 5,241,360 A | 8/1993 | Key et al. | |
| 6,765,653 B2 | 7/2004 | Shirai et al. | |
| 2004/0246461 A1 | 12/2004 | Ohtomo et al. | |

* cited by examiner

*Primary Examiner* — Luke Ratcliffe

(74) *Attorney, Agent, or Firm* — Kilpatrick Townsend & Stockton LLP

(57) ABSTRACT

A distance measuring system comprises a radiation source, a radiation detector, a measuring lens system, a first damping filter, a second damping filter and an actuator. The radiation source is constructed to emit optical radiation and the radiation detector is constructed to detect optical radiation. The measuring lens system is designed to project optical radiation to a target and to conduct optical radiation reflected by the target to the radiation detector. The first damping filter has a constant damping and can be arranged in a beam path between the radiation source and the measuring lens system. The second damping filter has an adjustable damping and can be arranged in a beam path between the measuring lens system and the radiation detector. The actuator is mechanically coupled to the first and also to the second damping filter and is constructed to move the first and the second damping filter in common.

18 Claims, 4 Drawing Sheets

Figure 1:
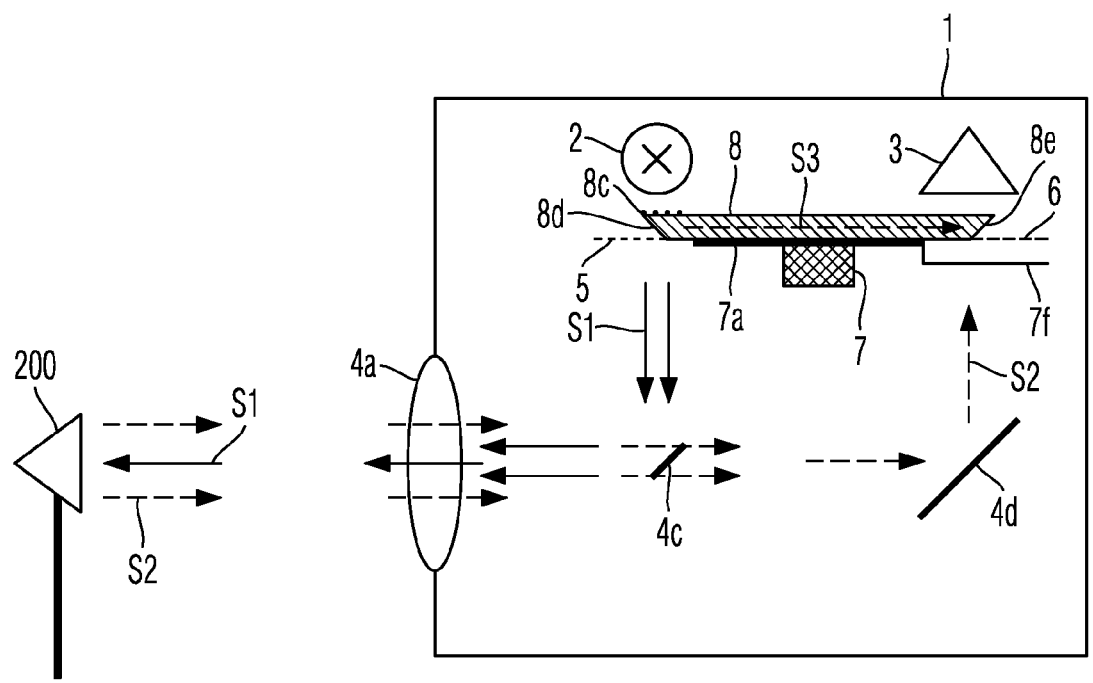

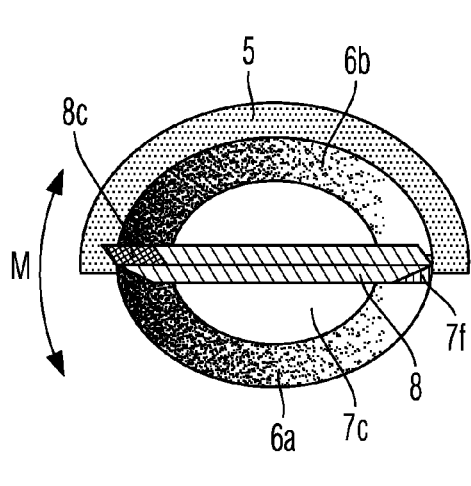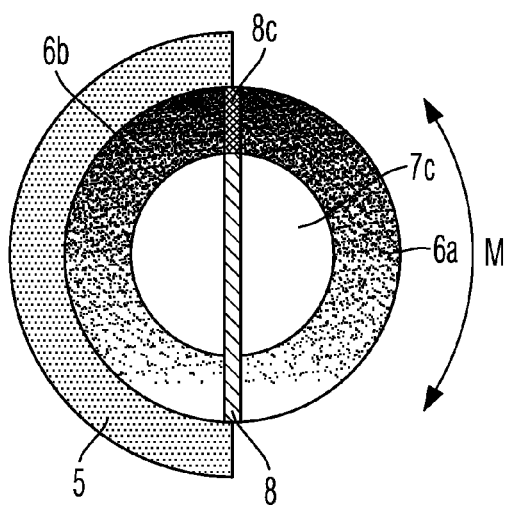
Fig. 4A        Fig. 4B
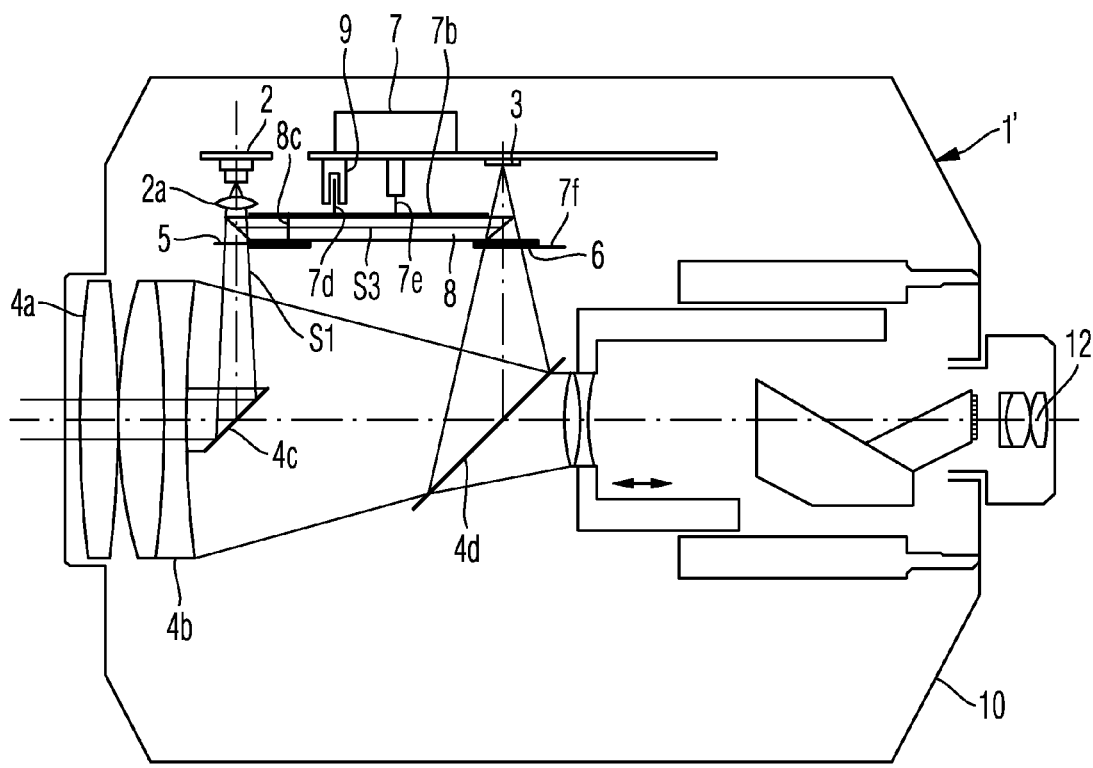
Fig. 5

DISTANCE MEASURING SYSTEM

CROSS REFERENCE TO RELATED APPLICATIONS

This application claims priority to German Patent Application No. 12 2012 107 329.5, filed Aug. 9, 2012, the entire contents of which are hereby incorporated by reference in their entirety for all purposes.

BACKGROUND OF THE INVENTION

Field of the Invention

The present invention relates to a distance measuring system suitable for measuring a distance of a target from the system, and in particular a compact, lightweight and economical construction of such a system.

Short Description of the Related Prior Art

A plurality of technologies is available for determining the distance of a target from the distance measuring system.

These technologies usually contain the emitting of radiation (e.g., optical radiation, ultrasound and radar) in the direction of the target and a receiving of a part of the radiation reflected back from the target. The distance from the system to the target is determined by one of several approaches familiar to the person skilled in the art; therefore, a detailed description will be dispensed with. A few examples are described in the documents U.S. Pat. No. 4,113,381, U.S. Pat. No. 5,241,360, U.S. Pat. No. 6,765,653 or US 2004/0246461. For example, some systems calculate the distance from the system to the target by determining a phase difference between radiation emitted to the target and reflected radiation received from the target, whereas, on the other hand other systems measure a time difference between the emission of the radiation to the target and between the reception of the reflected radiation on the system. For example, the measuring of the distance can take place by emitting a modulated microwave carrier signal or modulated optical carrier signal, which signal is reflected by the target. The distance can then be determined, for example, by emitting and receiving multiple frequencies and by determining the integer number of wavelengths to the target for each frequency.

The target can be a so-called "non-cooperative target" that has a comparatively low reflectivity for the particular radiation (a wall of a building, a stone, a tree or another object in the environment). Such a non-cooperative target is also designated as a "DR (direct reflex) target". Alternatively, the target can be a so-called "cooperative target" that has a comparatively high reflectivity for the particular radiation (for example, a prism or a reflector). Such a cooperative target is also designated as a "PR (prism reflex) target".

Distance measuring systems that use optical radiation customarily comprise a radiation source, a radiation detector and a measuring lens system in order to project optical radiation emitted by the radiation source to the target and to guide optical radiation reflected by the target back to the radiation detector. In order to adapt the radiation detector to changing intensities of the optical radiation that is reflected from the different targets and received by the radiation detector, the systems furthermore frequently comprise a variable damper in order to adapt the intensity of the optical radiation incident on the radiation detector. Since radiation detectors with an inner gain (amplification) for optical radiation are subject to a certain temperature drift, the systems furthermore frequently comprise a reference lens system/reference optics and an optical switch in order to directly guide optical radiation generated by the radiation source and conducted via a previously known reference stretch/reference distance to the radiation detector and thus make possible a scaling of the radiation detector regarding reinforcement and drift.

SUMMARY OF THE INVENTION

Embodiments of the invention are directed to a distance measuring system that has an especially compact and lightweight construction that can be economically produced.

Embodiments of a distance measuring system comprise a radiation source, a radiation detector, a measuring lens system (measuring optics), a first damping filter, a second damping filter and an actuator. The radiation source is designed to emit optical radiation. In this document the term optical radiation denotes electromagnetic radiation with wavelengths of 300 nm to 1,600 nm. Therefore, the concept "optical radiation" comprises in this document in addition to the visible light from approximately 380 nm to 780 nm also a partial range of the near ultraviolet radiation from 300 nm to 380 nm as well as near infrared radiation from 780 nm to 1,600 nm. The radiation detector is designed to detect optical radiation. The measuring lens system is designed to project optical radiation emitted by the radiation source to a target and to guide optical radiation reflected by the target to the radiation detector as measured radiation. The measuring lens system can comprise, for example, several optical lenses, deflecting elements (such as mirrors, for example), filters and light guides (such as optical fiber rods or light waveguides, for example). The first damping filter has a constant damping and can be arranged in a beam path between the radiation source and the measuring lens system. The first damping filter therefore serves to adapt the intensity of the radiation projected via the measuring lens system to the target. For example, the first damping filter allows an adaptation of the radiation intensity to the type of target used (cooperative target or non-cooperative target). The second damping filter has an adjustable damping and can be arranged in a beam path between the measuring lens system and the radiation detector. The second damping filter serves to adapt the intensity of the optical radiation incident on the radiation detector. The term "adjustable damping" means that the damping of the second damping filter can either be electrically changed (for example, by using a liquid crystal filter or a tiltable hologram filter) or that the damping filter comprises areas of different transmissivity along an extension direction of the filter (for example, by using a gradual filter with a filter action that can be changed continuously or gradually via the filter surface such as, for example, a wedge filter). According to one embodiment the second damping filter is a wedge filter produced by printing or by optical illumination of a photo film.

The above structure reduces the complexity of the construction of the distance measuring system, and the weight and the manufacturing costs.

The actuator is coupled mechanically to the first as well as to the second damping filter at the same time in order to move the first and second damping filters in common.

Since the first damping filter that can be arranged in front of the radiation source as well as the second damping filter that can be arranged in front of the radiation detector are coupled to the actuator, it is possible to actuate both damping filters in common with one single actuator. It is therefore not necessary to provide each damping filter with its own actuator. As a result, the complexity of the construction of the distance measuring system, the weight and the manufacturing costs are reduced.

According to an embodiment the radiation source is a light-emitting diode (LED) or a laser and in particular a laser diode. The optical radiation can, for example, be modulated and in particular have a carrier signal.

According to an embodiment the radiation source can be designed to be adjustable.

According to an embodiment the radiation detector is a photomultiplier or a photodiode and in particular an avalanche photodiode.

According to an embodiment the radiation detector has an integrated detector filter.

According to an embodiment the actuator is a motor and in particular a rotary motor or linear motor.

According to an embodiment the first and second damping filters are carried by a common carrier, which carrier is coupled to the actuator. Thus, the coupling of the damping filters with the actuator does not take place directly but rather indirectly via the common carrier. The use of the carrier allows a more flexible arrangement of the actuator in the distance measuring system.

Furthermore, it is emphasized that the carrier and the first and second damping filters can, for example, be either separate elements or can be manufactured in one piece.

According to an embodiment the carrier is a movably supported, plate-like solid body.

According to an embodiment a transmission and/or a rack-and-pinion drive is/are provided in between the actuator and the carrier.

According to an embodiment the distance measuring system furthermore comprises a reference lens system (reference optics) for conducting optical radiation emitted by the radiation source inside the distance measuring system to the radiation detector as internal reference radiation. Thus, the reference radiation guided by the reference lens system runs from the radiation source to the radiation detector over a given distance without leaving the distance measuring system. The reference lens system is mechanically coupled to the actuator. Therefore, the reference lens system is moved by the actuator in common with the first and the second damping filters. Since the length of the beam path of the reference lens system is constant and known in advance, it is possible by means of the reference lens system to detect and compensate temperature drifts of the components such as, for example, the radiation detector used in the distance measuring system.

According to an embodiment the beam path between the reference lens system and the radiation detector is free of optical lenses. As a result, the complexity of the construction of the distance measuring system the weight and the manufacturing costs are reduced further.

According to an embodiment a reference filter with constant damping is arranged in the beam path between the radiation source and the reference lens system and/or in the beam path of the reference lens system and/or in the beam path between the reference lens system and the radiation detector. This reference filter can be required in order to adapt the intensity of the internal reference radiation guided by the reference lens system from the radiation source to the radiation detector to a measuring range of the radiation detector used.

According to an embodiment the reference lens system comprises at least one pair of mirror surfaces oppositely arranged in pairs along a beam path bent by the mirror surfaces. The mirror surfaces enclose an angle between 70° and 110° and in particular between 80° and 100° and furthermore in particular 90°. A first mirror surface of each pair of mirror surfaces can be arranged in a beam path defined by the radiation source and a second mirror surface of each pair of mirror surfaces can be simultaneously arranged in a beam path defined by the radiation detector. In the simplest case the reference lens system can therefore consist of only two mirror surfaces as well as facultatively one reference filter. The reference filter can be arranged between these mirror surfaces or in front of one of these mirror surfaces.

According to an embodiment the distance measuring system furthermore comprises a rhomboid prism mechanically decoupled from the actuator, whose entrance surface is permanently partially arranged in a beam path defined by the radiation source. Furthermore, the reference lens system comprises at least one pair of mirror surfaces oppositely arranged in pairs along a beam path bent by the mirror surfaces and which enclose an angle between 70° and 110° and in particular between 80° and 100° and furthermore in particular 90°, whereby a first mirror surface of one of each pair of mirror surfaces can be arranged in a beam path defined by the exit surface of the rhomboid prism and a second mirror surface of one of each pair of mirror surfaces can be simultaneously arranged in a beam path defined by the radiation detector. The rhomboid prism brings about a parallel offset of incoming and outgoing beams.

According to an embodiment the entrance surface of the rhomboid prism extends only to such an extent into the beam path defined by the radiation source that less than 15% and in particular less than 10% and furthermore in particular less than 5% of the optical radiation emitted by the radiation source is taken out by the rhomboid prism.

According to an embodiment the mirror surfaces are parts of a one-piece optical fiber rod. Such optical fiber rods can be economically produced, for example, with the injection molding method. The mirror surfaces can be made available given an appropriate selection of material and shape of the optical fiber rod by total reflection on a boundary surface of the optical fiber rod.

According to an embodiment the at least one optical fiber rod consists of polycarbonate.

According to an embodiment at least one element of the reference lens system is carried in common with the first and the second damping filters by a common carrier coupled to the actuator. Thus, the coupling of the reference lens system to the actuator does not take place directly but rather indirectly via the common carrier. The use of the carrier allows a more flexible arrangement of the actuator in the distance measuring system.

According to an embodiment the distance measuring system also comprises a photo interrupter that detects the presence of a position pin provided on the carrier, whereby the position pin indicates whether the reference lens system is arranged in the beam path between the radiation source and the radiation detector. In this manner it can be reliably ensured even when using an actuator with low accuracy that the reference lens system is positioned in the beam path between the radiation source and the radiation detector.

According to an embodiment the carrier is a circular disk comprising a rotary shaft in the center which rotary shaft is coupled to the actuator.

According to an embodiment the first damping filter extends over 180° or 160° to 180° of the circumference of the carrier and the second damping filter extends over 360° or 320° to 360° of the circumference of the carrier. The second damping filter can be arranged radially inside or outside the first damping filter.

According to an embodiment the distance measuring system comprises exactly one actuator coupled to the first damping filter and to the second damping filter.

According to an embodiment the distance measuring system comprises exactly one radiation source.

According to an embodiment the second damping filter has first and second sections of varying transmissivity along the same direction of movement of the damping filter caused by the actuator. In a first section the transmissivity changes along the direction of movement from a high transparency to a low transparency. In a second section the transmissivity changes along the same direction of movement from a high transparency to a low transparency. In such a second damping filter an area of minimal transparency is arranged adjacent to an area of maximum transparency (whereby the reference lens system can be provided between these areas). If the measuring is started at a position of the second damping filter at which the area in-between the two sections of the damping filter is arranged in the beam path between the measuring lens system and the light detector, the maximum value of the transparency (that is advantageous for the beginning of a measuring of non-cooperative targets) as well as the minimum value of the transparency (that is advantageous for the beginning of a measuring of cooperative targets) can be very rapidly reached/used by moving the second damping filter by only a slight extent. As a consequence the time required for carrying out of measurement can be significantly reduced. Furthermore, the use of a slow actuator for moving the second damping filter is possible, as a result of which the manufacturing costs can be kept low.

According to an embodiment the second damping filter comprises first and second sections of varying transmissivity along the same direction of movement of the damping filter produced by the actuator, a first section in which the transmissivity changes along the direction of movement from a high transparency to a low transparency and a second section in which the transmissivity changes along the direction of movement from a low transparency to a high transparency. In such a second damping filter an area of minimal transparency is arranged adjacent to an area of minimal transparency and/or an area of maximal transparency is arranged adjacent to an area of maximal transparency (whereby the reference lens system can be provided between these areas).

The use of the second damping filter with at least two sections of changing transmissivity has the further advantage that one of these sections can be used for the measuring of non-cooperative targets and the other section for the measuring of cooperative targets.

Embodiments of a measuring instrument comprise a housing, whereby the housing comprises the previously described distance measuring system. The measuring instrument can be, for example, an electronic distance meter.

SHORT DESCRIPTION OF THE FIGURES

It is pointed out in this connection that the concepts "comprise", "have", "include", "contain", and "with", as well as their grammatical modifications used in this specification and the claims are to be generally understood as a non-conclusive enumeration of features such as, e.g., method steps, devices, areas, magnitudes and the like and in no way exclude the presence of other or additional features or groupings of other or additional features.

Other features of the invention result from the following description of exemplary embodiments in conjunction with the claims as well as the figures. In the figures the same or similar elements are designated with the same or similar reference numerals. It is pointed out that the invention is not limited to the embodiments of the described exemplary embodiments but rather is determined by the scope of the attached patent claims. In particular, the individual features can be realized in embodiments in accordance with the invention in another number and combination than in the examples indicated in the following. Reference is made to the attached figures in the following explanation of an exemplary embodiment of the invention.

Figure 2A:
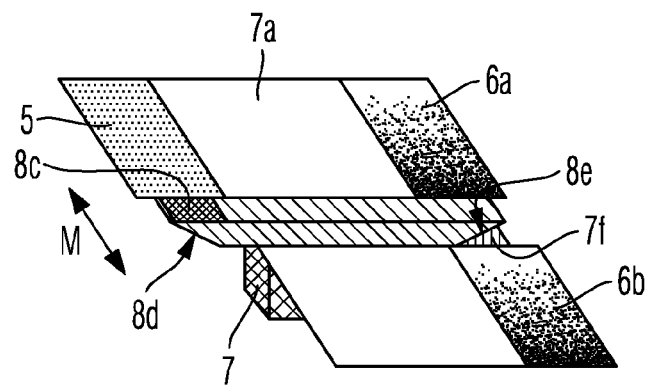
Figure 2B:
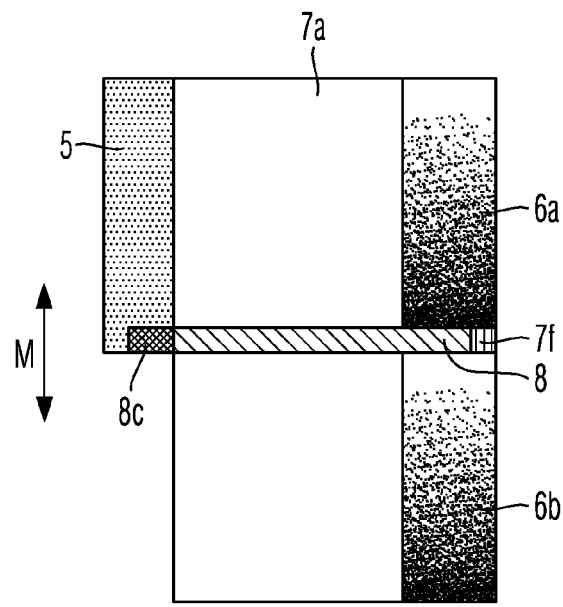
Figures 3A, 3B:
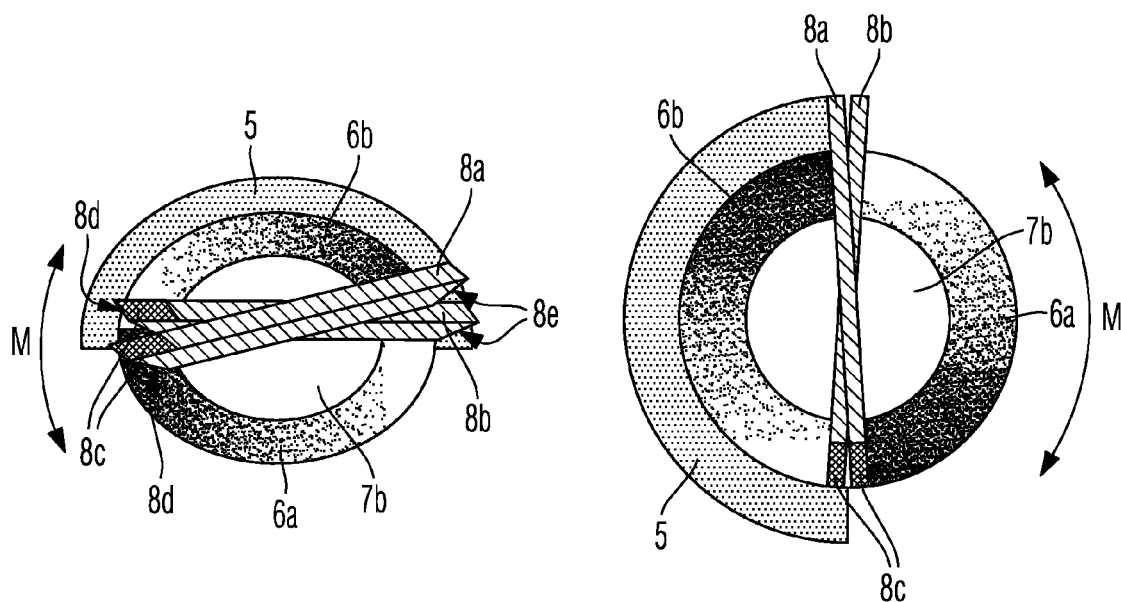
Figure 6:
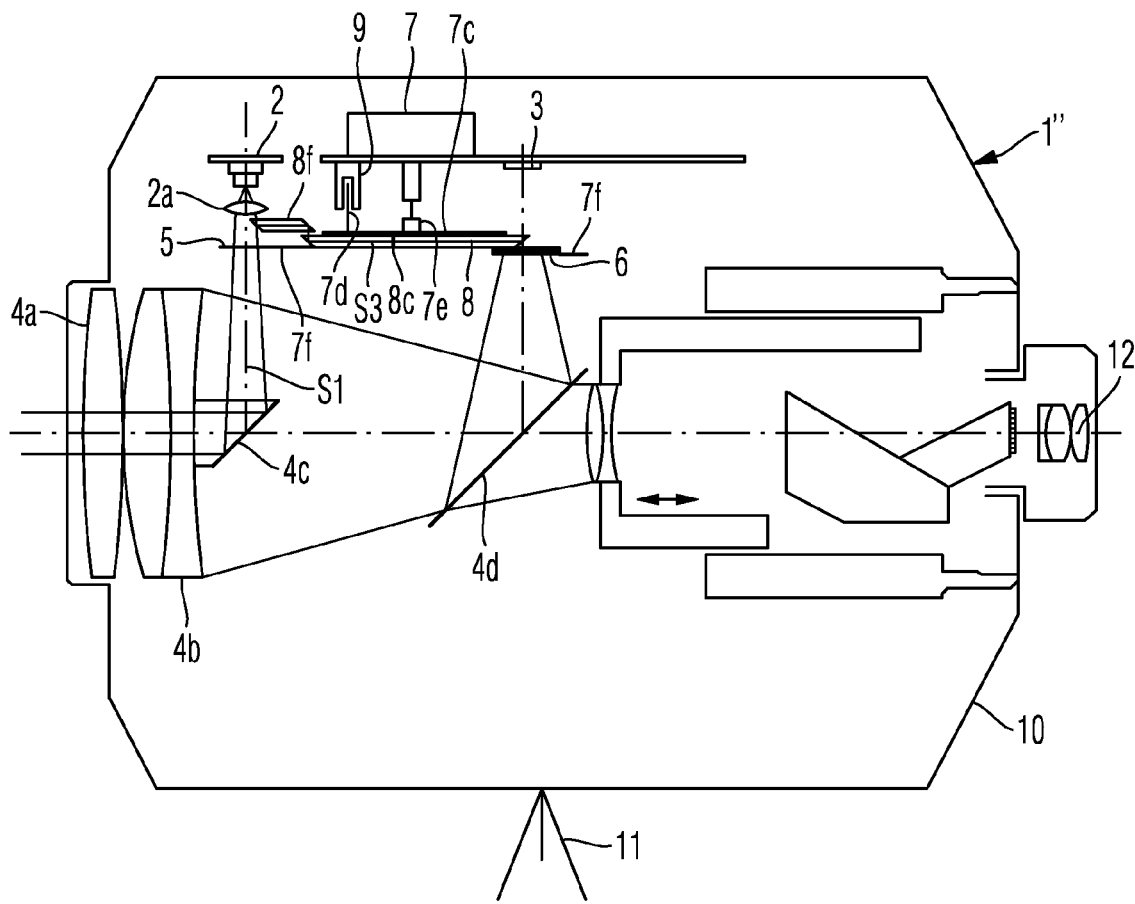

FIG. 1 shows a schematic view of a distance measuring system and of an optical target in accordance with a first embodiment;

FIGS. 2A, 2B schematically show a perspective view and a top view onto a carrier with a first and second damping filter as it can be used in the distance measuring system of FIG. 1;

FIGS. 3A, 3B schematically show a perspective view and a top view onto an alternative carrier with a first and second damping filter as it can be used in the distance measuring system of FIG. 5;

FIGS. 4A, 4B schematically show a perspective view and a top view onto an alternative carrier with a first and second damping filter as it can be used in the distance measuring system of FIG. 6;

FIG. 5 shows a schematic view of a distance measuring system in accordance with a second embodiment; and FIG. 6 shows a schematic view of a distance measuring system in accordance with a third embodiment.

DETAILED DESCRIPTION OF EXEMPLARY EMBODIMENTS

The exemplary embodiments described in the following contain elements that are similar in function and construction and are designated to the extent possible by similar reference numerals. Therefore, the description of other embodiments and the abstract of the invention should be taken into consideration in order to understand the features of the individual components of a specific embodiment.

The general construction and the general manner of operation of a distance measuring system 1 are described with the example of a first embodiment in the following with reference made to FIG. 1.

The distance measuring system 1 schematically shown in FIG. 1 in cross section comprises a radiation source in the form of a laser diode 2, a radiation detector in the form of an avalanche photodiode 3, a measuring lens system (measuring optics) symbolically represented by an objective lens 4a and two mirrors 4c and 4d, a first damping filter in the form of a neutral density filter 5, a second damping filter 6 in the form of two wedge filters 6a, 6b arranged adjacent to one another, and an actuator in the form of a linear motor 7.

The laser diode 2 emits optical radiation that runs through the neutral density filter 5, is bent by a first mirror surface 4c of the measuring lens system and is projected via the objective lens 4a of the measuring lens system to an optical target 200.

In the embodiment shown the optical target 200 is a reflector and therefore a cooperative optical target that has a high reflectivity for incident optical radiation S1.

However, the use of a cooperative optical target 200 is not prescribed. When using a non-cooperative target with low reflectivity for optical radiation the optical radiation emitted by the laser diode 2 does not run through the neutral density filter 5 before the bending by the first mirror surface 4c. To this end the neutral density filter 5 is moved out of the beam path set by the laser diode 2, as will still be shown.

The optical radiation S2 reflected by the optical target 200 is bundled by the objective lens 4a, bent by a second mirror surface 4 of the measuring lens system and supplied via the second damping filter 6 to the avalanche photodiode 3 that is constructed for detecting the optical radiation.

In the embodiment of FIG. 1 the neutral density filter 5 and the two wedge filters 6a and 6b of the second damping filter 6 are carried by a common carrier 7a consisting of radiation-impermeable plastic.

The arrangement of the filters 5, 6a, 6b on the carrier 7a can be recognized especially well from the FIGS. 2A and 2B. The carrier 7a has a rectangular form. The neutral density filter 5 is arranged along a longitudinal side of the carrier 7a. The neutral density filter 5 extends over one half the length of the longitudinal side and has a constant damping over its entire extent. Two wedge filters 6a and 6b are arranged adjacent to one another along the opposite, other longitudinal side. The individual wedge filters 6a, 6b extend over almost one half the length of the longitudinal side. The wedge filters 6a, 6b are fastened on the carrier 7a in such a manner that the transmissivity of the one wedge filter 6a changes along the longitudinal side of the carrier 7a from a high transparency to a low transparency and the transmissivity of the adjacent, other wedge filter 6b changes along the longitudinal side of the carrier 7a from a high transparency to a low transparency. Therefore, the two wedge filter 6a, 6b are arranged on the carrier 7a in such a manner that the area of low transparency of the one wedge filter 6a borders on the area of high transparency of the other wedge filter 6b.

The carrier 7a is coupled to a linear motor 7 that can move the carrier 7a with the filters 5, 6a, 6b fastened on it linearly back and forth along a direction M. In FIG. 1 the movement of the carrier 7a moves out of the image plane and into the image plane.

Since the laser diode 2 and the avalanche photodiode 3 are stationary, the section along the longitudinal side of the carrier 7a can be selectively arranged by the linear motor 7 in the beam path of the laser diode 2 in which the neutral density filter 5 is arranged, or the section along the longitudinal side of the carrier 7a that is free of the neutral density filter 5 can be selectively arranged by the linear motor 7 in the beam path of the laser diode 2. At the same time the transmissivity of the associated wedge filters 6a, 6b is adjustable. Since the neutral density filter 5 extends over the entire length of the longitudinal side of the carrier 7a like the oppositely arranged wedge filter 6a, the entire adjustment range of the wedge filter 6a can be adjusted by moving the carrier 7a while simultaneously using the neutral density filter 5.

In the embodiment shown the carrier 7a furthermore carries an optical fiber rod (light waveguide) 8 of polycarbonate with a cross section that is rectangular in its entirety. The optical fiber rod 8 is arranged transversely to the longitudinal sides of the carrier 7a in the middle of the longitudinal sides and thus extends from an end section of the neutral density filter 5 to an area between the adjacent wedge filters 6a, 6b.

The optical fiber rod 8 comprises two oppositely arranged mirror surfaces 8d, 8e that enclose an angle of 90° with one another. In the area of the mirror surfaces 8d, 8e the optical fiber rod 8 has entrance surfaces for optical radiation. A reference neutral density filter 8c with constant damping is arranged in front of the entrance surface in the area of the mirror surface 8d. Radiation entering via the reference neutral density filter 8c into the optical fiber rod 8 is coupled in by the first mirror surface 8d of the optical fiber rod 8, which mirror surface is on the left in the figure, and conducted as optical reference radiation S3 to the opposite second mirror surface 8e, that is on the right in the figure. Subsequently, the reference radiation S3 is bent by the second mirror surface 8e in such a manner that it leaves the optical fiber rod 8 parallel to the direction in which the radiation entered into the optical fiber rod 8.

It is now possible by shifting the carrier 7a using the linear motor 7 to arrange the first mirror surface 8d of the two mirror surfaces 8d, 8e of the optical fiber rod 8 in the beam path defined by the laser diode 2 and to arrange the second mirror surface 8e of the two mirror surfaces 8d, 8e at the same time in the beam path defined by the avalanche photodiode 3. In this manner optical radiation produced by the laser diode 2 is supplied via the reference neutral density filter 8c and the optical fiber rod 8 directly to the avalanche photodiode 3 as optical reference radiation S3. Since the length of the beam path depends on the geometry of the components of the distance measuring system 1 and is therefore constant and can be determined, it is possible with this optical reference radiation S3 to detect and compensate temperature drifts of the structural components used.

In order that the optical reference radiation S3 is not adversely affected by perturbing radiation incident via the objective lens 4a, a shutter 7f consisting of light-impermeable plastic carried by the carrier 7a is arranged under the mirror surface 8e of the optical fiber rod 8.

Starting from a position in which the mirror surfaces 8d, 8e of the optical fiber rod 8 are arranged in the beam path of the laser diode 2 respectively of the avalanche photodiode 3, it is possible by shifting the carrier 7a using the linear motor 7 to selectively enter directly into an operating state for measuring cooperative targets (neutral density filter 5 is arranged in the beam path of the laser diode 2) or into an operating state for measuring non-cooperative targets (neutral density filter 5 is not arranged in the beam path of the laser diode 2).

In the following the construction and the method of operation of a distance measuring system 1 is described in accordance with a second embodiment with reference made to the FIGS. 3A, 3B and 5. In particular, the differences to the above first embodiment are discussed and otherwise reference is made to the previous first embodiment.

As is apparent from the FIGS. 3A and 3B, the carrier 7b carrying neutral density filter 5 and the two wedge filters 6a and 6b is not rectangular in this embodiment but rather constructed as a circular disk.

The neutral density filter 5 extends over 180° of the circumference of the carrier 7b and the two wedge filters 6a and 6b are arranged radially inside the neutral density filter 5 and extend jointly over almost 360° of the circumference of the carrier 7b. As can be seen, the neutral density filter 5 and the wedge filters 6a and 6b each have the form of a circular arc.

As in the previously described first embodiment the wedge filters 6a and 6b are arranged on the carrier 7b in such a manner that an area of low transparency of the one wedge filter 6a borders on an area of high transparency of the other wedge filter 6b. Furthermore, an area of high transparency of the one wedge filter 6a borders on an area of low transparency of the other wedge filter 6b. In the circumferential direction of the carrier 7b the transmissivity of the wedge filters 6a, 6b therefore changes in a first section from a high transparency to a low transparency and in a bordering second section likewise from a high transparency to a low transparency.

In an area in which the two wedge filters 6a and 6b border one another two optical fiber rods 8a, 8b arranged so that they cross over one another are fastened on the carrier 7b. As shown in FIG. 5 the optical fiber rods 8a, 8b can be arranged in one plane. Alternatively, the optical fiber rods can be arranged in two planes lying upon another.

The optical fiber rods 8a, 8b described in this second embodiment differ from the optical fiber rod 8 described in the first embodiment in particular in that the reference neutral density filter 8c is not arranged in the area of the light entrance surface but in the area of the light exit surface of the optical fiber rods 8a, 8b. The light exit surfaces of the optical fiber rods 8a, 8b are, as in the previous, first embodiment, arranged in the area of the wedge filters 6a, 6b and the light entrance surfaces in the area of the neutral density filter 5.

Therefore, it is possible by rotating the carrier 7b around its geometric center to selectively arrange the neutral density filter 5 in the beam path of the laser diode 2. Furthermore, even the light entrance surface of one of the optical fiber rods 8a, 8b can be arranged in the beam path of the laser diode 2 and at the same time the light exit surface of the respective optical fiber rod 8a, 8b carrying the reference neutral density filter 8c can be arranged in the beam path of the avalanche photodiode 3. Furthermore, the damping of the wedge filters 6a, 6b that can be arranged in front of the avalanche photodiode 3 can be adjusted by rotating the carrier 7b.

The construction shown in the FIGS. 3A and 3B can be used, for example, in the distance measuring system 1' shown in FIG. 5.

The distance measuring system 1' shown in FIG. 5 differs from the construction shown in the FIGS. 3A and 3B only in that the reference neutral density filter 8c is not arranged on the light exit surface of the optical fiber rods 8a, 8b but rather in the interior of the optical fiber rods 8a, 8b.

Furthermore, the carrier 7b in the embodiment of FIG. 5 additionally carries a shutter 7f arranged underneath the light exit surface of the optical fiber rods 8a, 8b.

As is apparent from FIG. 5 the carrier 7b additionally has a rotary shaft 7e in its geometric center that is coupled to a rotary motor 7. The rotary motor 7 therefore replaces the linear motor of the first embodiment.

Furthermore, the carrier 7b has a positioning pin 7d that cooperates with a photo interrupter 9 of the distance measuring system 1' in order to determine whether the light entrance surfaces and light exit surfaces of one of the optical fiber rods 8a, 8b are arranged in the beam path defined by the laser diode 2 respectively the avalanche photodiode 3.

In the distance measuring system 1' shown in FIG. 5 a lens 2a is arranged in front of the laser diode 2. The measuring lens system has, in addition to the objective lens 4a shown in FIG. 1, another objective lens 4b. In addition, an ocular 12 is provided and a housing 10 is shown.

In FIG. 5, the carrier 7b is rotated such that optical radiation S1 emitted by the laser diode 2 passes nearby the optical fiber rods 8a, 8b. Thus, optical radiation S2 reflected by the target passes nearby the shutter 7f.

The construction and the method of operation of a distance measuring system 1 according to a third embodiment is described in the following with reference made to the FIGS. 4A, 4B and 6. In particular, the differences to the previous first and second embodiments are discussed and otherwise reference is made to the previous embodiments.

In distinction to the second embodiment, in the third embodiment only one optical fiber rod 8 is used. The reference neutral density filter 8c can be arranged in the area of the light entrance surface of the optical fiber rod 8 as shown in FIGS. 4A, 4B or inside the optical fiber rod 8 as shown in FIG. 6. A shutter 7f is arranged underneath the light exit surface of the optical fiber rod 8. The light exit surface and light entrance surface of the optical fiber rod 8 are—in distinction to the previous embodiments—both arranged in the area of the wedge filters 6a, 6b. Furthermore, the wedge filters 6a and 6b are arranged on the carrier 7c in such a manner that an area of high transparency of the one wedge filter 6a borders an area of high transparency of the other wedge filter 6b and in a corresponding manner an area of low transparency of the one wedge filter 6a borders an area of low transparency of the other wedge filter 6b. Thus, the wedge filters 6a, 6b are fastened on the carrier 7c in such a manner that the transmissivity of the one wedge filter 6a changes along the circumferential direction of the carrier 7c from a low transparency to a high transparency, and the transmissivity of the adjacent other wedge filter 6b changes along the circumferential direction of the carrier 7c from a high transparency to a low transparency.

Furthermore, according to this fourth embodiment a stationary rhomboid prism 8f of polycarbonate that is not coupled to the carrier 7c is provided whose entrance surface is permanently and partially arranged in the beam path defined by the laser diode 2 and whose exit surface provides a parallel offset of a part of the optical radiation emitted by the laser diode 2 in the direction of the avalanche photodiode 2.

Thus, it is possible by rotating the carrier 7c to arrange the entrance surface of the optical fiber rod 8 in the beam path defined by the exit surface of the rhomboid prism 8f and to arrange the exit surface of the optical fiber rod 8 at the same time in the beam path defined by the avalanche photodiode 3.

The entrance surface of the rhomboid prism 8f projects only to such an extent into the beam path of the laser diode 2 that only 5% of the optical radiation emitted by the laser diode is taken out by the rhomboid prism. Therefore, it is also possible in this embodiment, just as in the other embodiments, to eliminate the reference neutral density filter 8c. It is emphasized that the present invention is not limited to a rhomboid prism that takes out 5% of the optical radiation emitted by the laser diode. Even more or less than 5% of the radiation can be taken out.

In FIG. 6, the carrier 7c is rotated such that the entrance surface of the optical fiber rod 8 is arranged in the beam path defined by the exit surface of the rhomboid prism 8f and the exit surface of the optical fiber rod 8 is arranged in the beam path defined by the avalanche photodiode 3. Thus, the carrier 7c is rotated such that optical radiation S2 reflected by the target and bent towards the avalanche photodiode 3 by mirror 4d is blocked the shutter 7f that is arranged below the exit surface of the optical fiber rod 8.

In addition, FIG. 6 shows that the housing 10, that receives the distance measuring system, is carried by a tripod 11.

The invention claimed is:

1. A distance measuring system, comprising:
a radiation source;
a radiation detector;
a measuring lens system for projecting optical radiation emitted by the radiation source to a target and for guiding optical radiation reflected by the target to the radiation detector;

a first damping filter, that has a constant damping and can be arranged in a beam path between the radiation source and the measuring lens system, a second damping filter, that has an adjustable damping and can be arranged in a beam path between the measuring lens system and the radiation detector;

an actuator, that is mechanically coupled to the first damping filter as well as to the second damping filter;

a reference lens system for conducting optical radiation emitted by the radiation source inside the distance measuring system to the radiation detector, whereby the reference lens system is mechanically coupled to the actuator; and a rhomboid prism mechanically decoupled from the actuator, wherein the rhomboid prism includes an entrance surface that is permanently partially arranged in a beam path defined by the radiation source;

whereby the reference lens system comprises at least one pair of mirror surfaces, wherein each pair of mirror surfaces of the at least one pair of mirror surfaces comprises two mirror surfaces that are arranged opposite one another along a beam path bent by the mirror surfaces and which enclose an angle between 70° and 110°, whereby a first mirror surface of each pair of mirror surfaces can be arranged in a beam path defined by the exit surface of the rhomboid prism and a second mirror surface of each pair of mirror surfaces can be simultaneously arranged in a beam path defined by the radiation detector.

2. The distance measuring system according to claim 1, whereby the first damping filter and the second damping filter are carried by a common carrier, which carrier is coupled to the actuator.

3. The distance measuring system according to claim 1, whereby a beam path between the reference lens system and the radiation detector is free of optical lenses.

4. The distance measuring system according to claim 1, whereby a reference filter with constant damping is arranged in a beam path between the radiation source and the reference lens system or in a beam path of the reference lens system or in a beam path between the reference lens system and the radiation detector.

5. The distance measuring system according to claim 1, whereby the mirror surfaces are parts of a one-piece optical fiber rod.

6. The distance measuring system according to claim 1, whereby at least one element of the reference lens system is carried in common with the first damping filter and the second damping filter by a common carrier which carrier is coupled to the actuator.

7. The distance measuring system according to claim 6, further comprising a photo interrupter that detects the presence of a position pin provided on the carrier, whereby the position pin indicates whether the reference lens system is arranged in a beam path between the radiation source and the radiation detector.

8. The distance measuring system according to claim 2, whereby the common carrier is a circular disk comprising a rotary shaft in the center which rotary shaft is coupled to the actuator.

9. The distance measuring system according to claim 8, whereby
the first damping filter extends over 180° of the circumference of the common carrier;
and the second damping filter extends over 360° of the circumference of the common carrier.

10. The distance measuring system according to claim 1, whereby the distance measuring system comprises exactly one actuator coupled to the first and to the second damping filter.

11. The distance measuring system according to claim 1, whereby the second damping filter comprises first and second sections of varying transmissivity along the same direction of movement of the second damping filter produced by the actuator, a first section in which the transmissivity changes along the direction of movement from a high transparency to a low transparency and a second section in which the transmissivity changes along the direction of movement from a high transparency to a low transparency; or
whereby the second damping filter comprises first and second sections of changing transmissivity along the same direction of movement of the second damping filter produced by the actuator, a first section in which the transmissivity changes along the direction of movement from a high transparency to a low transparency and a second section in which the transmissivity changes along the direction of movement from a low transparency to a high transparency.

12. A measuring instrument comprising:
a housing;
whereby the housing receives a distance measuring system comprising:
a radiation source;
a radiation detector;
a measuring lens system for projecting optical radiation emitted by the radiation source to a target and for guiding optical radiation reflected by the target to the radiation detector;
a first damping filter, that has a constant damping and can be arranged in a beam path between the radiation source and the measuring lens system;
a second damping filter, that has an adjustable damping and can be arranged in a beam path between the measuring lens system and the radiation detector;
an actuator, that is mechanically coupled to the first damping filter as well as to the second damping filter;
a reference lens system for conducting optical radiation emitted by the radiation source inside the distance measuring system to the radiation detector, whereby the reference lens system is mechanically coupled to the actuator; and
a rhomboid prism mechanically decoupled from the actuator, wherein the rhomboid prism includes an entrance surface that is permanently partially arranged in a beam path defined by the radiation source;
whereby the reference lens system comprises at least one pair of mirror surfaces, wherein each pair of mirror surfaces of the at least one pair of mirror surfaces comprises two mirror surfaces that are arranged opposite one another along a beam path bent by the mirror surfaces and which enclose an angle between 70° and 110°, whereby a first mirror surface of each pair of mirror surfaces can be arranged in a beam path defined by the exit surface of the rhomboid prism and a second mirror surface of each pair of mirror surfaces can be simultaneously arranged in a beam path defined by the radiation detector.

13. The measuring instrument according to claim 12, whereby the first damping filter and the second damping filter are carried by a common carrier, which carrier is coupled to the actuator.

14. The measuring instrument according to claim 12, whereby a beam path between the reference lens system and the radiation detector is free of optical lenses.

15. The measuring instrument according to claim 12, whereby a reference filter with constant damping is arranged in a beam path between the radiation source and the reference lens system or in a beam path of the reference lens system or in a beam path between the reference lens system and the radiation detector.

16. The distance measuring system according to claim 1, whereby the distance measuring system comprises exactly one radiation source.

17. A distance measuring system, comprising:
- a radiation source;
- a radiation detector;
- a measuring lens system for projecting optical radiation emitted by the radiation source to a target and for guiding optical radiation reflected by the target to the radiation detector;
- a first damping filter, that has a constant damping and can be arranged in a beam path between the radiation source and the measuring lens system,
- a second damping filter, that has an adjustable damping and can be arranged in a beam path between the measuring lens system and the radiation detector;
- an actuator, that is mechanically coupled to the first damping filter as well as to the second damping filter;
- a reference lens system for conducting optical radiation emitted by the radiation source inside the distance measuring system to the radiation detector, whereby the reference lens system is mechanically coupled to the actuator; and
- a rhomboid prism mechanically decoupled from the actuator, wherein the rhomboid prism includes an entrance surface that is permanently partially arranged in a beam path defined by the radiation source;
- whereby the reference lens system comprises at least one pair of mirror surfaces which are oppositely arranged in pairs along a beam path bent by the mirror surfaces and which enclose an angle between 70° and 110°, whereby the mirror surfaces are parts of a one-piece optical fiber rod, and whereby a first mirror surface of each pair of mirror surfaces can be arranged in a beam path defined by the exit surface of the rhomboid prism and a second mirror surface of each pair of mirror surfaces can be simultaneously arranged in a beam path defined by the radiation detector;
- whereby the first and second damping filters are carried by a common carrier, which carrier is coupled to the actuator; and
- whereby at least one element of the reference lens system is carried in common with the first and the second damping filters by a common carrier which carrier is coupled to the actuator.

18. The distance measuring system according to claim 17, whereby a reference filter with constant damping is arranged in a beam path between the radiation source and the reference lens system or in a beam path of the reference lens system or in a beam path between the reference lens system and the radiation detector.

* * * * *